Patented Aug. 23, 1949

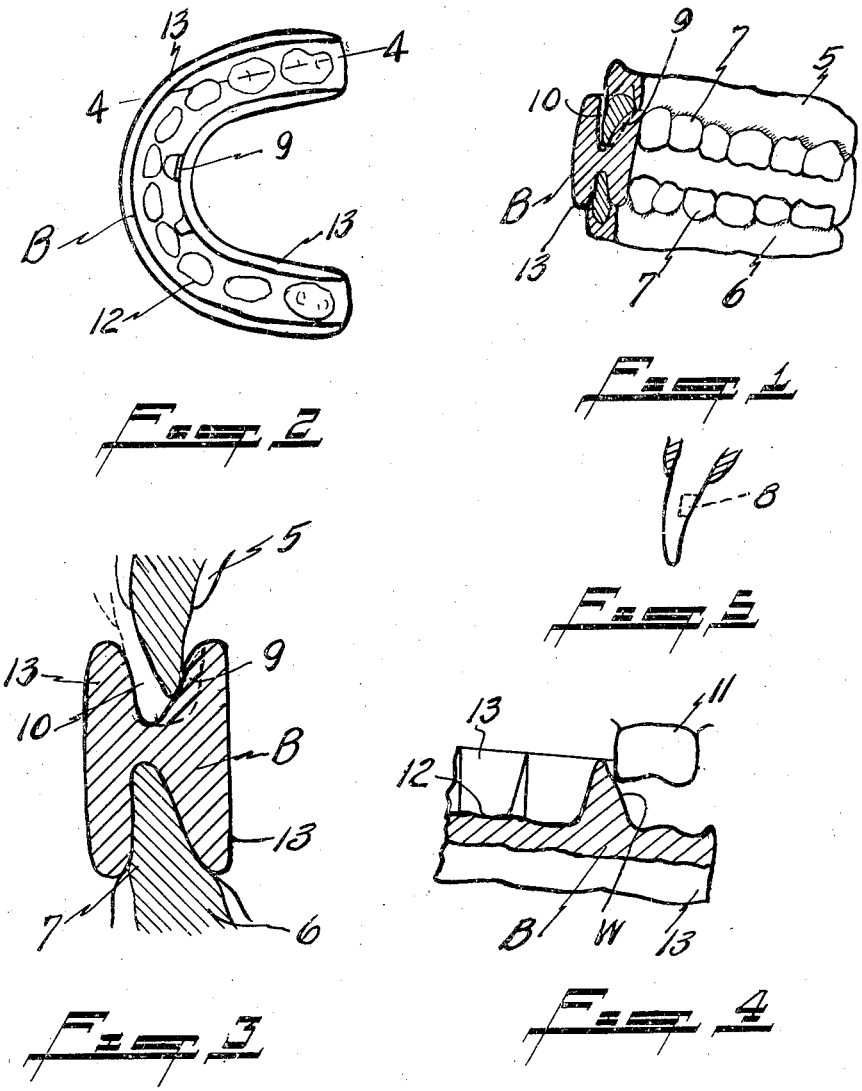

2,479,780

UNITED STATES PATENT OFFICE 2,479,780

ORTHODONTIC APPLIANCE

Orrin Remensnyder, Saginaw, Mich.

Application November 23, 1945, Serial No. 630,225

1 Claim. (Cl. 32—14)

This invention relates to an appliance for use by dentists in general as well as for orthodontists, for correcting the bite, straightening, spacing and properly regulating the teeth in the mouth.

One of the prime objects of the invention is to design an appliance and method by means of which crooked or irregularly positioned teeth may be gradually moved to desired position without injury to the teeth or hard or soft tissues, with a minimum of discomfort to the patient and at minimum expense.

Another object is to provide a simple, practical, and inexpensive appliance that can be readily prepared by the orthodontist or dentist, and which is then worn by the patient at night or any other selected intervals, the degree of straightening or corrective pressure placed on the tooth or teeth being entirely under the control of the patient, thus eliminating the possibility of excessive pressure being placed on a certain tooth or teeth as frequently occurs with appliances worn at all times by the patient, and on which the pressure is adjusted at certain intervals by the orthodontist.

A further object is to provide a simple, practical appliance formed of a soft rubber, acrylic, or plastic material which can be prepared in less than an hour's time by the dentist, after which it is constructed by a dental laboratory, whereas, one method with which I am familiar requires from four to six hours by an experienced orthodontist. The fact that it requires less than one hour's time by the dentist, makes it very economical and enables the dentist to handle a large number of cases. It also enables many persons at present unable, due to expense and time involved, to take advantage of the instant method and appliance to straighten teeth, correct the bite, and thus enhance facial appearance and insure proper mastication of food.

A still further object is to provide an appliance which can be prepared by dentists in general, enabling them to treat and correct at least fifty (50) per cent of the orthodontic cases which they heretofore have been unable to treat and correct.

Still a further object is to provide an appliance which can be used by the orthodontist to supplement his usual orthodontic treatment, the appliance being used in advance of special devices, to lengthen, shorten, expand, or contact the arches and correct certain correctable irregularities, that cause an interference with normal function, thereby assisting nature to a normal occlusion of the teeth, and afterward for retaining the teeth in correct position or alignment until such time as the natural adjustment of the tissues is completed.

With the above and other objects in view, the present invention consists in the combination and arrangement of parts, hereinafter more fully described, illustrated in the accompanying drawing, and more particularly pointed out in the appended claim, it being understood that changes may be made in the form, size, proportion, and minor details of construction, without departing from the spirit, or sacrificing any of the advantages of the invention.

In the drawing:

Fig. 1 is a side-elevational view showing my appliance in place on an upper and lower jaw.

Fig. 2 is a top plan view of an upper jaw appliance.

Fig. 3 is a vertical, sectional view taken on the line 3—3 of Fig. 1.

Fig. 4 is an enlarged, fragmentary view taken on the line 4—4 of Fig. 2.

Fig. 5 is an enlarged view of one of the teeth.

Referring now more particularly to the drawing in which I have shown one embodiment of my invention, the numerals 5 and 6 indicate the upper and lower jaw members respectively from which the teeth 7 project in the usual manner.

It must, of course, be understood that each case will be individual and different, and in carrying out the invention, the dentist first takes an accurate impression of the patient's tooth structure, making a plaster of Paris or stone casting of each jaw from these impressions, so that they show all of the teeth in the position they then occupy; the dentist then mounts the models in an articulator in their correct relation, and opens the bite on the articulator.

That part of the casting showing the mal-position tooth or teeth that are to be moved is then covered or built up with plaster of Paris, either on the inside or outside, depending on the direction the tooth is to be moved, after which the built up portion is trimmed to the natural curvature of the arch required to accommodate the mal-positioned teeth in their correct alignment.

On the opposite side from which the tooth is to be moved, a hole or depression 8 of predetermined shape is formed in the tooth, the depth of the depression corresponding to the distance the tooth is to be moved, so that when the appliance is vulcanized, the soft rubber will flow into said depression, forming a bulge or pressure wedge 9 of predetermined shape in the appliance, and this pressure wedge is of prime importance because it forms the surface which the mal-positioned tooth engages as biting pressure is applied by the patient, the space 10 directly ahead or behind the tooth and into which the tooth is to be moved being formed by the built up section of the model, and if more pressure is required as treatment progresses, a piece of thin rubber can be cemented or otherwise secured to the face of the pressure wedge.

Should it be necessary to rotate one or more of the teeth, the form or depression 8 is so located that the pressure wedge engages near one edge of the tooth, thus tending to rotate the tooth to correct position.

In the event that it is desired to move the first molar to the back or distal, the cast is built up with plaster of Paris back of the first molar, prior to the eruption of the twelve-year molar, so as to provide necessary space in the appliance for the distal movement of the first molar, the mesial surface of the tooth is trimmed at an angle to slant it from the cusp to the gum line, so that it produces, in the rubber appliance, an inclined surface or pressure wedge W, and in use, the tooth 11 engages this inclined wedge and the biting pressure tends to move the tooth back or distal.

In certain cases, it may be necessary to build up with plaster of Paris over the occlusional surface of the teeth on the casts, which produce, in the appliance, the necessary space for the tooth or teeth to elongate or extrude and holds the tooth out of occlusion, and by cutting off the occlusal surface on the casts, produces in the appliance, built up rubber with which the tooth engages, and this tends to shorten or intrude the tooth or teeth when biting pressure is applied.

In constructing the appliance, the casts of the upper and lower jaw are first made up of plaster of Paris or stone, the space ahead or behind the mal-positioned tooth or teeth is then built up with plaster of Paris as previously described, after which the casts are mounted on an articulator (not shown) in correct relation with the bite open from three to five millimeters.

Beeswax is then heated and made into a roll of predetermined diameter; this wax roll is then placed between the teeth on the open articulator and the articulator is closed to the position set.

The wax is then moulded and trimmed to a point just above the gum line, and in practice, a distance of between two and three millimeters is allowed between the teeth or built up plaster of Paris and the outer surface of the wax rims. It is not necessary to press wax in the tooth forms.

The case is next flasked, separated, and packed with a soft rubber. When the case B is vulcanized, the tooth impressions 12 will be formed in the inner faces of both upper and lower upstanding walls 13, the depressions 8 forming the projecting pressure wedges 10 as above described.

The surplus rubber is then trimmed off and the appliance is sanded and polished as usual.

These wedges 10 can be of any desired shape or form, and when the appliance is in use, biting pressure by the patient brings the tooth or teeth into sliding, biting engagement with the projecting wedge and gradually moves the tooth into alignment with the natural curvature that has been established in the casts.

For the correction of cross bite of the posterior teeth, the method is substantially the same as previously described, excepting that the plaster of Paris is also filled in between and around the cusps on these posterior teeth to be moved, and this removes in the rubber appliance the imprints of the teeth, and interference of movement is eliminated.

It will, of course, be obvious that the entire appliance will be formed of a soft rubber to provide an elastic, compressible, and flexible base B similar to that shown in Patent 1,691,785, entitled "Dental massage device," granted to me under date of November 13, 1928, but it will also be understood that the depressions 8 can be packed with harder or more elastic rubber, if desired, so that either a softer or a harder, more firm wedge or bearing surface is provided.

The appliance is designed for home use by the patient, it is inserted in the mouth, and as above stated, the base is elastic and compressible, and in biting, the one face of the tooth to be moved engages the built up surface or wedge 10, and as the patient bites down, the pressure on the tooth or teeth in question tends to move them into the space prepared, the degree of movement being governed by the patient himself, this wedging action continuing as the appliance is worn, until the tooth or teeth have assumed the proper desired position.

What I claim is:

The method of forming an orthodontic appliance which consists in making a model of the patient's tooth structure, building up the teeth in the model so that they conform to the natural curvature of the patient's mouth arch, providing a depression of predetermined depth in certain of said teeth, investing the models to form a case, and then packing with soft rubber and vulcanizing the case to form an appliance in which the rubber flows into the openings in the teeth and forms inwardly projecting bearing surfaces on the side walls of the appliance.

ORRIN REMENSNYDER.

REFERENCES CITED

The following references are of record in the file of this patent:

Journal Orthodontics and Oral Surgery, vol. 31, #6 (1945), pp. 297–304, an article by H. D. Kesling.